US010825448B2

(12) United States Patent
Yannam et al.

(10) Patent No.: US 10,825,448 B2
(45) Date of Patent: *Nov. 3, 2020

(54) QUANTUM TECHNOLOGY FOR USE WITH EXTRACTING INTENTS FROM LINGUISTICS

(71) Applicant: Bank of America Corporation, Charlotte, NC (US)

(72) Inventors: Ramakrishna R. Yannam, The Colony, TX (US); Viju Kothuvatiparambil, Seattle, WA (US); Donatus Asumu, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,231

(22) Filed: May 22, 2020

(65) Prior Publication Data
US 2020/0286466 A1    Sep. 10, 2020

Related U.S. Application Data

(63) Continuation of application No. 15/987,079, filed on May 23, 2018, now Pat. No. 10,665,228.

(51) Int. Cl.
*G06F 17/27* (2006.01)
*G10L 15/00* (2013.01)
(Continued)

(52) U.S. Cl.
CPC .............. *G10L 15/10* (2013.01); *G06F 17/16* (2013.01); *G10L 15/197* (2013.01); *G10L 15/28* (2013.01);
(Continued)

(58) Field of Classification Search
None
See application file for complete search history.

(56) References Cited

U.S. PATENT DOCUMENTS 5,457,768 A ‡ 10/1995 Tsuboi .................... G10L 15/18
704/21
6,073,091 A * 6/2000 Kanevsky ............. G10L 15/197
704/257
(Continued)

OTHER PUBLICATIONS

Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.‡
(Continued)

*Primary Examiner* — Richard Z Zhu
(74) *Attorney, Agent, or Firm* — Weiss & Arons LLP; Michael A. Springs, Esq.

(57) ABSTRACT

Apparatus for mapping a user utterance onto a plurality of intents is provided. The apparatus may include an intent training database that includes a plurality of tokens and intents. The apparatus may include a processor. The processor may utilize a token-intent map to generate a token-row map and an intent-column map. The processor may map the plurality of tokens onto a token-intent matrix. The processor may generate a token-cognitive matrix, a cognitive-comprehension matrix and an intent-cognitive matrix from the decomposition. The cognitive-comprehension matrix may be the space of entanglement between the token-cognitive matrix and the intent-cognitive matrix. The processor may reduce the rank of the cognitive-comprehension matrix. The processor may compute a plurality of token vectors from a computation of the token-cognitive matrix and the cognitive-comprehension matrix. The processor may compute a plurality of intent-cognitive vectors from a computation of
(Continued)

the cognitive-comprehension matrix and the intent-cognitive matrix.

13 Claims, 1 Drawing Sheet

(51) Int. Cl.
| | | |
|---|---|---|
| *G10L 15/10* | (2006.01) | |
| *G10L 15/28* | (2013.01) | |
| *G10L 15/197* | (2013.01) | |
| *G06F 17/16* | (2006.01) | |
| *G06F 16/33* | (2019.01) | |
| *G10L 15/18* | (2013.01) | |
| *G10L 15/19* | (2013.01) | |
| *G10L 15/06* | (2013.01) | |

(52) U.S. Cl.
CPC ...... *G06F 16/3344* (2019.01); *G06F 16/3347* (2019.01); *G10L 15/06* (2013.01); *G10L 15/1815* (2013.01); *G10L 15/1822* (2013.01); *G10L 15/19* (2013.01)

(56) References Cited

U.S. PATENT DOCUMENTS

| | | | | |
|---|---|---|---|---|
| 6,401,061 B1 ‡ | 6/2002 | Zieman | G06F 40/30 | 704/10 |
| 6,678,679 B1 * | 1/2004 | Bradford | G06F 16/3326 | |
| 6,847,966 B1 * | 1/2005 | Sommer | G06F 16/3347 | 707/739 |
| 7,051,017 B2 * | 5/2006 | Marchisio | G06F 16/334 | 707/713 |
| 7,113,943 B2 * | 9/2006 | Bradford | G06F 16/3346 | 707/739 |
| 7,194,471 B1 * | 3/2007 | Nagatsuka | G06F 16/355 | |
| 7,246,312 B2 ‡ | 7/2007 | Harnngton | G06Q 10/04 | 715/255 |
| 7,269,598 B2 * | 9/2007 | Marchisio | G06F 40/279 | |
| 7,634,406 B2 * | 12/2009 | Li | G10L 15/19 | 704/243 |
| 7,647,228 B2 ‡ | 1/2010 | Silvera | G10L 15/22 | 704/27 |
| 7,881,935 B2 ‡ | 2/2011 | Asano | G10L 15/18 | 704/25 |
| 8,121,838 B2 ‡ | 2/2012 | Kobal | G10L 15/22 | 704/23 |
| 8,275,608 B2 * | 9/2012 | Ah-Pine | G06F 40/295 | 704/9 |
| 8,583,416 B2 * | 11/2013 | Huang | G10L 15/1822 | 704/251 |
| 8,688,453 B1 ‡ | 4/2014 | Joshi | G06F 40/30 | 704/25 |
| 8,700,404 B1 * | 4/2014 | Chotimongkol | G10L 15/1815 | 704/257 |
| 8,983,840 B2 * | 3/2015 | Deshmukh | G10L 15/18 | 704/257 |
| 9,099,088 B2 ‡ | 8/2015 | Washio | G10L 17/26 | |
| 9,620,147 B2 ‡ | 4/2017 | Deshmukh | G10L 15/18 | |
| 9,734,144 B2 ‡ | 8/2017 | Descălu | G06F 17/2785 | |
| 9,961,200 B1 * | 5/2018 | Kothuvatiparambil | G10L 15/22 | |
| 9,977,778 B1 ‡ | 5/2018 | Perez | G06F 17/279 | |
| 10,354,677 B2 ‡ | 7/2019 | Mohamed | G10L 15/08 | |
| 2005/0261905 A1 ‡ | 11/2005 | Pyo | G10L 13/10 | 704/25 |
| 2006/0149544 A1 * | 7/2006 | Hakkani-Tur | G10L 15/22 | 704/236 |
| 2012/0226492 A1 * | 9/2012 | Tsuboi | G06F 16/3344 | 704/9 |
| 2014/0244249 A1 ‡ | 8/2014 | Mohamed | G10L 25/63 | 704/23 |
| 2016/0203498 A1 ‡ | 7/2016 | Das | G06Q 30/02 | 705/7.29 |
| 2018/0314087 A1 ‡ | 11/2018 | Ito | G02F 1/133526 | |

OTHER PUBLICATIONS

Michal Kosinski, "Mining Big Data to Extract Patterns and Predict Real-Life Outcomes," http://psycnet.apa.org/fulltext/2016-57141-003.html, APA PsycNET, Retrieved on Apr. 10, 2018.
"Singular Value Decomposition," https://en.wikipedia.org/wiki/Singular-value_decomposition, Retrieved on Apr. 30, 2018.

\* cited by examiner
‡ imported from a related application

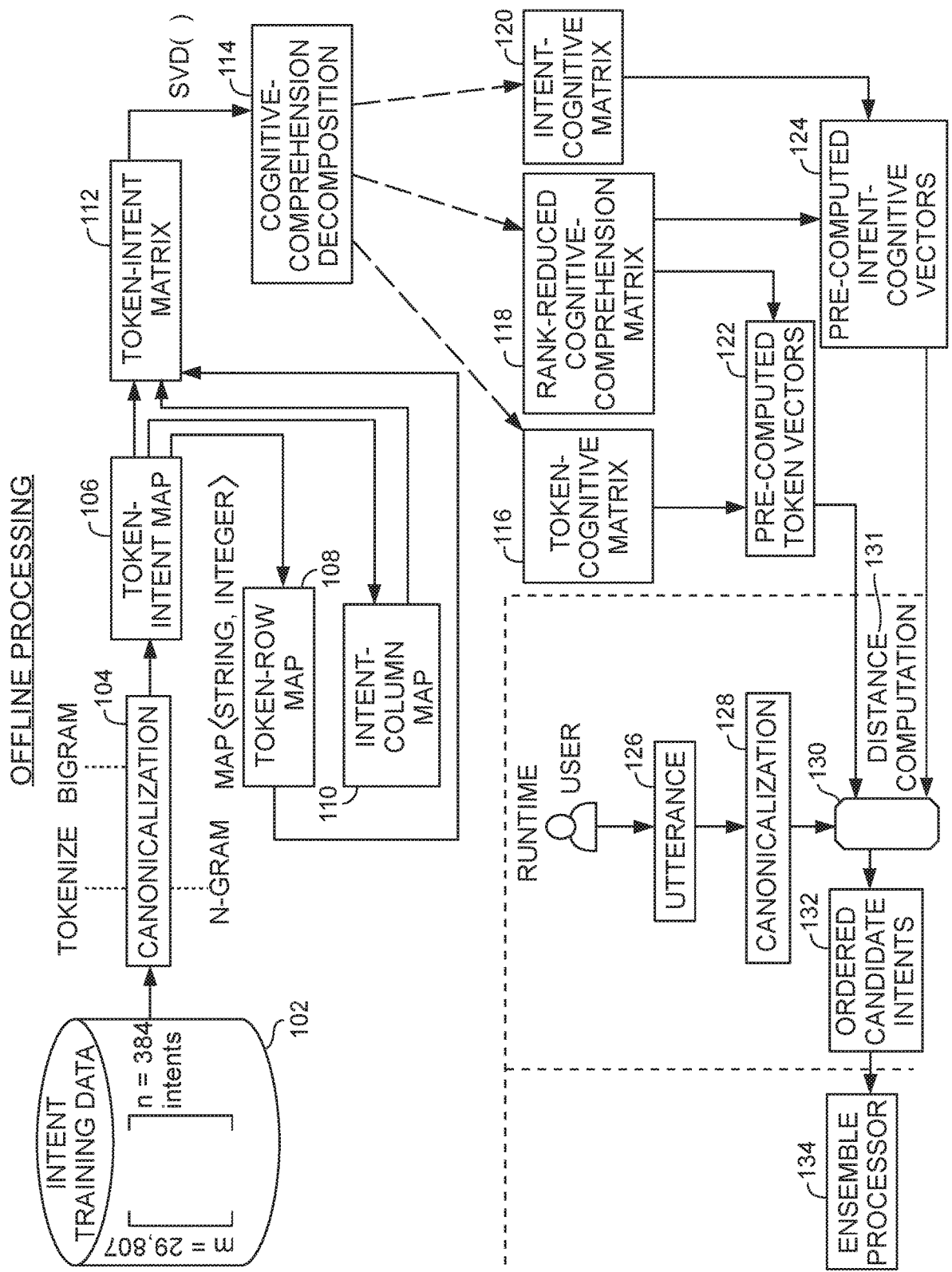

QUANTUM TECHNOLOGY FOR USE WITH EXTRACTING INTENTS FROM LINGUISTICS

CROSS-REFERENCE TO RELATED APPLICATION

This application is a continuation of U.S. patent application Ser. No. 15/987,079, filed on May 23, 2018, entitled QUANTUM TECHNOLOGY FOR USE WITH EXTRACTING INTENTS FROM LINGUISTICS, which is hereby incorporated by reference herein it is entirety.

FIELD OF THE INVENTION

This invention relates to using quantum technology to influence intent extraction from linguistics.

BACKGROUND OF THE INVENTION

Voice response units receive utterances from human callers. These utterances typically correspond to the reason/intent for the human caller's call. These voice response units use a variety of techniques to correctly discern the meaning of the utterance, or the intent of the human caller's utterance.

It may be desirable to use quantum technology in order to correctly discern the meaning of the utterance.

SUMMARY OF THE DISCLOSURE

Behavior of matter can be quantized. Quantization may mean that certain characteristic properties of matter at a sub-atomic scale, such as position, velocity and electric charge can only be one of a small number of discrete values. This set of values is determined by the specific configuration of particles that compose the atom. Experimental confirmation of quantization theory was based on the insights from a number of theoretical postulates. Several insights were brought about by the solutions derived from Erwin Schrodinger's equation (Equation A). In Equation A, $\hat{H}$ is the Hamiltonian operator, $\Psi_i$ is the Quantum Electrodynamic state and E is the observable total quantum energy.

$$\hat{H}\Psi_i = E\Psi_i \qquad \text{Equation A:}$$

Equation A shows that the few admissible configurations of electron paths and positions in atomic structures depend on the eigenvalues of energy states that emerge when a Hamiltonian operator (H) is applied to some arbitrary state of the subatomic configuration. Schrodinger's equation shows that only a few well-defined states are admissible. The well-defined states depend on the most stable—i.e., requiring the least energy—configurations of electron positions and paths.

Equation A also shows that there are areas of exclusion—i.e., locations wherein it was impossible to find an electron at any time in an atomic configuration. This formulation may be analogous to the general eigenvalue problem formulation, shown at Equation B. In Equation B, A is the operator matrix, $\Psi$ is the eigenfunction and $\lambda$ is the eigenvalue.

$$A\Psi = \lambda\Psi \qquad \text{Equation B:}$$

In Equation B, the eigenvalues correspond to any value of lambda for which the equation has a solution. Furthermore, given a decomposition of matrix A into its constituents (a first matrix, a second matrix and a third matrix) through a process such as a singular value decomposition, which is explained in greater detail in the detailed description, may yield a second, intermediate matrix. The second, intermediate matrix may enable transformation between the spaces of the first matrix and the third matrix.

In any given domain of discourse for which a conversation between a human and a machine takes place, the action(s) being requested of the machine by the human caller may be translated into a mapping from a field of the utterances made by a person to a field of possible stored meanings. These possible meanings may reflect the intention of the utterance. These possible meanings may translate into action(s) being requested of the machine. When the field of possible meanings is summarized by a finite set of human intents, then each unambiguous utterance may map to one possible meaning in the finite set of intents. The mapping of a set of utterances to a single intent shows the quantization of the set of utterance from the space of utterances to the space of meanings.

An utterance, and substantially all of its equivalent forms, maps to a single specific intent to the exclusion of any others. Therefore, syntactic variations of any utterance—i.e., utterance embellishment and other changes that do change the utterance meaning—, may be identified as a single intent. On the other hand, in some instances, minor changes in an utterance may change the entire meaning of an utterance. Therefore, the distance between a mapped utterance and its intent cannot always be predicted by syntax alone. Therefore a method in which there exists a cognitive-comprehension space, or a relationship between utterances and intent, defined as one of the decomposition matrices, is provided.

A matrix identifying the relationship between utterances and their meanings is created in order to identify the cognitive-comprehension space. The matrix may include a plurality of training utterances and a plurality of intents represented by the utterances. Each training utterance may be created based on a sample of historic utterances. Each utterance may be a sentence, phrase, or linear sequence of text tokens (words). In order to capture the linearity of utterance tokens, bi-grams (sequence of two words) and trigrams (sequence of three words) are also included in the matrix. In some embodiments, regular expressions may capture certain recurring elements within utterances.

Each utterance may be a row in an utterance-intent matrix. Each column of the matrix may correspond to an individual intent. Each entry in the matrix may be set to a function of the count of the number of times that each token appears in the training data for that specific intent. In this embodiment, the function may simply be a count. Tokens that do not appear in the training data associated with the intent may be represented by a zero entry. In other embodiments, each entry may be set to a logarithmic function of the count.

The matrix may be decomposed into three matrices, a first matrix, a second matrix and a third matrix, using a decomposition method. The second matrix may be considered the cognitive-comprehension matrix, or the matrix that defines the space of quantum entanglement between the utterances and the intents.

At runtime, a user utterance may be received. The user utterance may include a combination of tokens already identified by the system and tokens unidentified by the system. The machine may canonicalize the user utterance≥i.e., divide into individual tokens, bigrams and trigrams, remove quotation and punctuation marks and translate pluralized tokens into standard singular form. The machine may then compute a vector distance between the canonicalized tokens and the plurality of intent vectors included in the intent-utterance matrix. The machine may compute which intent is closest to the user utterance. The machine may provide the user with action(s) based on the determined intent.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative flow chart in accordance with principles of the invention.

DETAILED DESCRIPTION OF THE DISCLOSURE

A method for mapping a user utterance onto a plurality of intents is provided. The method may include receiving intent training data at an intent training database. The method may include canonicalizing the intent training data into a plurality of tokens. The tokens may include a plurality of unigrams, bigrams and trigrams. The method may include forming a token-intent map. The token-intent map may include a plurality of intents as column identifiers. The token-intent map may include a plurality of tokens as row identifiers.

The method may include generating a token-row map based on the token-intent map. The token-row map may include each token and the ordinal row in which the token appears in the intent training database. The method may include generating an intent-column map based on the token-intent map. The intent-column map may include each intent and the column in which intent appears.

The method may include mapping the plurality of tokens on a token-intent matrix. The mapping may utilize the token-row map and intent-column map. The token-intent matrix may include each token, each intent and a score for each token relative to each intent. The score may be based on the data included in the intent training database. The score may be the word size of the token multiplied by the amount of times the token appears in the training data for the identified intent.

The method may include executing a decomposition on the token-intent matrix. The decomposition may be singular value decomposition.

The method may include generating, from the decomposition, a token-cognitive matrix (U-matrix), a cognitive-comprehension matrix (S-matrix) and an intent-cognitive matrix (V-matrix). The cognitive-comprehension matrix may be the space of entanglement between the token-cognitive matrix and the intent-cognitive matrix.

The method may include reducing the rank of the token-cognitive matrix. The method may include computing a plurality of token vectors from a multiplication of the token-cognitive matrix and the cognitive-comprehension matrix. The method may include computing a plurality of intent-cognitive vectors from a multiplication of the cognitive-comprehension matrix and the intent-cognitive matrix.

The method may include receiving an utterance from a user. The method may include canonicalizing the utterance into a plurality of utterance tokens. The method may include comparing each of the utterance tokens to the plurality of token vectors. The method may include retrieving the token vectors that match the plurality of utterance tokens. The method may include calculating a centroid token vector from the retrieved token vectors.

The method may include executing a distance computation between the centroid token vector and each of the plurality of intent-cognitive vectors. The distance computation may be a cosine distance calculation. The method may include generating a scalar value from each distance computation between the centroid token vector and the plurality of intent-cognitive vectors.

The method may include ordering a plurality of intent-cognitive vectors based on each intent-cognitive vector's associated value. The method may include presenting a predetermined number of intent-cognitive vectors with the highest scalar values to an ensemble processor.

The ensemble process may arrange the intents associated with the intent vectors. The ensemble process may display the intents to the user.

Apparatus and methods described herein are illustrative. Apparatus and methods in accordance with this disclosure will now be described in connection with the FIGURES, which form a part hereof. The FIGURES show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a process flow. The process flow includes three stages. A first stage may include training a system to determine an intent based on an utterance. A second stage may include determining the intent of an utterance at run-time. A third stage may include transmitting the intent to an ensemble processor for further processing. The further processing may involve arranging and presenting the intent, retrieving an answer associated with the intent and/or presenting the retrieved answer to a user.

At step 102, intent training data may be received. Intent training data may include data used to train a system to determine an intent based on an utterance. An utterance may be a full sentence or a full statement that a user may speak, type and/or otherwise transmit to the system. As part of the training, the system may receive a plurality of training utterances and the intents that match the training utterances. An exemplary listing of intents, and exemplary training utterances that match the intents, is shown in Table 1 below.

TABLE 1

| Intent | Training Utterance |
| --- | --- |
| 1  Service Intent - Transaction | help with transaction |
| | help with a merchant charge |
| 2  Frequently Asked Question Intent - Overdraft Protection | what is overdraft protection |
| | tell me about overdraft protection |

TABLE 1-continued

| | Intent | Training Utterance |
|---|---|---|
| 3 | Service Intent - Contact Dispute | how do I dispute a charge<br>I want to contest a charge |
| 4 | Frequently Asked Question Intent - Debit Card Photo | I want to change my card photo<br>Help me get a photo on my debit card |
| 5 | Service Intent - Transaction Dispute | dispute a transaction<br>dispute a deposit |

The system may perform a canonicalization on the training utterances, as shown at step 104. The canonicalization may include the following steps. Each training utterance may be tokenized into a plurality of tokens. Additionally, each token may be stripped of punctuation marks or converted into a standard singular form if it is in plural form. A token may be an individual gram (word) of an utterance, or the smallest unit that makes sense.

Typically, a token may include a single word. Additionally, the system may compute n-grams from the plurality of tokens derived from the training utterances. Each n-gram may include a contiguous sequence of n words. For example, a unigram may include a single word, a bigram may include a contiguous sequence of two words and a trigram may include a contiguous sequence of three words, etc. Table 2 shows an exemplary listing of unigrams, bigrams and trigrams computed from the training utterances described above.

TABLE 2

| INTENT | N-GRAM | TOKEN |
|---|---|---|
| SERVICE INTENT - TRANSACTION | UNIGRAMS | help<br>with<br>transaction<br>a<br>merchant<br>charge |
| | BIGRAMS | help with<br>with transaction<br>with a<br>a merchant<br>merchant charge |
| | TRIGRAMS | help with transaction<br>help with a<br>with a merchant<br>a merchant charge |
| FREQUENTLY ASKED QUESTION INTENT - OVERDRAFT PROTECTION | UNIGRAMS | protection<br>what<br>is<br>tell<br>me<br>about |
| | BIGRAMS | what is<br>is overdraft<br>overdraft protection<br>tell me<br>me about<br>about overdraft |
| | TRIGRAMS | what is overdraft<br>is overdraft protection<br>tell me about<br>me about overdraft<br>about overdraft protection |
| SERVICE INTENT - CONTACT DISPUTE | UNIGRAMS | how<br>do<br>I<br>dispute<br>a<br>charge<br>want<br>to<br>contest |

TABLE 2-continued

| INTENT | N-GRAM | TOKEN |
|---|---|---|
| | BIGRAMS | how do<br>do I<br>I dispute<br>dispute a<br>a charge<br>I want<br>want to<br>to contest<br>contest a<br>a charge |
| | TRIGRAMS | how do I<br>do I dispute<br>I dispute a<br>to contest a<br>contest a charge |
| FREQUENTLY ASKED QUESTION INTENT - DEBIT CARD PHOTO | UNIGRAMS | I<br>want<br>to<br>photo<br>help<br>me<br>get<br>a<br>on<br>debit |
| | BIGRAMS | I want<br>want to<br>to change<br>change my<br>my card<br>card photo<br>Help me<br>me get<br>get a<br>a photo<br>photo on<br>on my<br>my debit<br>debit card |
| | TRIGRAMS | I want to<br>want to change<br>to change my<br>change my card<br>my card photo<br>Help me get<br>me get a<br>get a photo<br>a photo on<br>photo on my<br>on my debit<br>my debit card |
| SERVICE INTENT - TRANSACTION DISPUTE | UNIGRAMS | dispute<br>a<br>transaction<br>deposit |
| | BIGRAMS | dispute a<br>a transaction<br>a deposit |
| | TRIGRAMS | dispute a transaction<br>dispute a deposit |

A token-intent map may be generated from the intent training data, as shown at step 106. The token-intent map may include a plurality of intents as column identifiers and a plurality of tokens as row identifiers. Table 3 shows an exemplary representation of the structure of the token-intent map.

TABLE 3

| Token | 0 SERVICE INTENT - TRANSACTION | 1 FREQUENTLY ASKED QUESTION - OVERDRAFT PROTECTION | 2 SERVICE INTENT - CONTACT DISPUTE | 3 FREQUENTLY ASKED QUESTION - DEBIT CARD PHOTO | 4 SERVICE INTENT - TRANSACTION DISPUTE |
|---|---|---|---|---|---|
| 0 help | | | | | |
| 1 with | | | | | |
| 2 transaction | | | | | |
| 3 a | | | | | |
| 4 merchant | | | | | |
| 5 charge | | | | | |
| 6 help with | | | | | |
| 7 with transaction | | | | | |
| 8 with a | | | | | |
| 9 a merchant | | | | | |
| 10 merchant charge | | | | | |
| 11 help with transaction | | | | | |
| 12 help with a | | | | | |
| 13 with a merchant | | | | | |
| 14 a merchant charge | | | | | |
| 15 overdraft | | | | | |
| 16 protection | | | | | |
| 17 what | | | | | |
| 18 is | | | | | |
| 19 tell | | | | | |
| 20 me | | | | | |
| 21 about | | | | | |
| 22 what is | | | | | |
| 23 is protection | | | | | |
| 24 tell me | | | | | |
| 25 me about | | | | | |
| 26 about overdraft | | | | | |
| 27 overdraft protection | | | | | |
| 28 what is overdraft | | | | | |
| 29 is overdraft protection | | | | | |
| 30 tell me about | | | | | |
| 31 me about overdraft | | | | | |
| 32 about overdraft protection | | | | | |
| 33 how | | | | | |
| 34 do | | | | | |
| 35 I | | | | | |
| 36 dispute | | | | | |
| 37 charge | | | | | |
| 38 want | | | | | |
| 39 to | | | | | |
| 40 contest | | | | | |
| 41 how do | | | | | |
| 42 do I | | | | | |
| 43 I dispute | | | | | |
| 44 dispute a | | | | | |
| 45 a charge | | | | | |
| 46 I want | | | | | |
| 47 want to | | | | | |
| 48 to contest | | | | | |
| 49 contest a | | | | | |
| 50 a charge | | | | | |
| 51 how do I | | | | | |
| 52 do I dispute | | | | | |
| 53 I dispute a | | | | | |
| 54 dispute a charge | | | | | |

TABLE 3-continued

| Token | 0 SERVICE INTENT - TRANSACTION | 1 FREQUENTLY ASKED QUESTION INTENT - OVERDRAFT PROTECTION | 2 SERVICE INTENT - CONTACT DISPUTE | 3 FREQUENTLY ASKED QUESTION - INTENT - DEBIT CARD PHOTO | 4 SERVICE INTENT - TRANSACTION DISPUTE |
|---|---|---|---|---|---|
| 55 I want to | | | | | |
| 56 want to contest | | | | | |
| 57 to contest a | | | | | |
| 58 contest a charge | | | | | |
| 59 want | | | | | |
| 60 to | | | | | |
| 61 change | | | | | |
| 62 my | | | | | |
| 63 card | | | | | |
| 64 photo | | | | | |
| 65 me | | | | | |
| 66 get | | | | | |
| 67 on | | | | | |
| 68 debit | | | | | |
| 69 I want | | | | | |
| 70 want to | | | | | |
| 71 to change | | | | | |
| 72 change my | | | | | |
| 73 my card | | | | | |
| 74 card photo | | | | | |
| 75 Help me | | | | | |
| 76 me get | | | | | |
| 77 get a | | | | | |
| 78 a photo | | | | | |
| 79 photo on | | | | | |
| 80 on my | | | | | |
| 81 my debit | | | | | |
| 82 debit card | | | | | |
| 83 I want to | | | | | |
| 84 want to change | | | | | |
| 85 to change my | | | | | |
| 86 change my card | | | | | |
| 87 my card photo | | | | | |
| 88 Help me get | | | | | |
| 89 me get a | | | | | |
| 90 get a photo | | | | | |
| 91 a photo on | | | | | |
| 92 photo on my | | | | | |
| 93 on my debit | | | | | |
| 94 my debit card | | | | | |
| 95 dispute | | | | | |
| 96 deposit | | | | | |
| 97 dispute a | | | | | |
| 98 a transaction | | | | | |
| 99 a deposit | | | | | |
| 100 dispute a transaction | | | | | |
| 101 dispute a deposit | | | | | |

A token-row map may be created from the token-intent map, as shown at 108. A token-row map may include each token and the row in which that token appears. The token-row map may be used for identifying tokens based on its row. The identification may be particularly useful after data manipulation is performed on the contents of a filled-in token-intent map. Table 4 shows an exemplary token-row map.

TABLE 4

| <token, | row number> |
|---|---|
| <help, | 0> |
| <with, | 1> |
| <transaction, | 2> |
| <a, | 3> |
| <merchant, | 4> |
| <charge, | 5> |

TABLE 4-continued

| <token, | row number> |
|---|---|
| <help with, | 6> |
| <with transaction, | 7> |
| <with a, | 8> |
| <a merchant, | 9> |
| <merchant charge, | 10> |
| <help with transaction, | 11> |
| <help with a, | 12> |
| <with a merchant, | 13> |
| <a merchant charge, | 14> |
| <overdraft, | 15> |
| <protection, | 16> |
| <what, | 17> |
| <is, | 18> |
| <tell, | 19> |
| <me, | 20> |
| <about, | 21> |
| <what is, | 22> |
| <is overdraft, | 23> |
| <overdraft protection, | 24> |
| <tell me, | 25> |
| <me about, | 26> |
| <about overdraft, | 27> |
| <what is overdraft, | 28> |
| <is overdraft protection, | 29> |
| <tell me about, | 30> |
| <me about overdraft, | 31> |
| <about overdraft protection, | 32> |
| <how, | 33> |
| <do, | 34> |
| <I, | 35> |
| <dispute, | 36> |
| <charge, | 37> |
| <want, | 38> |
| <to, | 39> |
| <contest, | 40> |
| <how do, | 41> |
| <do I, | 42> |
| <I dispute, | 43> |
| <dispute a, | 44> |
| <a charge, | 45> |
| <I want, | 46> |
| <want to, | 47> |
| <to contest, | 48> |
| <contest a, | 49> |
| <a charge, | 50> |
| <how do I, | 51> |
| <do I dispute, | 52> |
| <I dispute a, | 53> |
| <dispute a charge, | 54> |
| <I want to, | 55> |
| <want to contest, | 56> |
| <to contest a, | 57> |
| <contest a charge, | 58> |
| <want, | 59> |
| <to, | 60> |
| <change, | 61> |
| <my, | 62> |
| <card, | 63> |
| <photo, | 64> |
| <me, | 65> |
| <get, | 66> |
| <on, | 67> |
| <debit, | 68> |
| <I want, | 69> |
| <want to, | 70> |
| <to change, | 71> |
| <change my, | 72> |
| <my card, | 73> |
| <card photo, | 74> |
| <Help me, | 75> |
| <me get, | 76> |
| <get a, | 77> |
| <a photo, | 78> |
| <photo on, | 79> |
| <on my, | 80> |
| <my debit, | 81> |
| <debit card, | 82> |
| <I want to, | 83> |

TABLE 4-continued

| <token, | row number> |
|---|---|
| <want to change, | 84> |
| <to change my, | 85> |
| <change my card, | 86> |
| <my card photo, | 87> |
| <Help me get, | 88> |
| <me get a, | 89> |
| <get a photo, | 90> |
| <a photo on, | 91> |
| <photo on my, | 92> |
| <on my debit, | 93> |
| <my debit card, | 94> |
| <dispute, | 95> |
| <deposit, | 96> |
| <dispute a, | 97> |
| <a transaction, | 98> |
| <a deposit, | 99> |
| <dispute a transaction, | 100> |
| <dispute a deposit, | 101> |

An intent-column map may be created and/or generated from the token-intent map, as shown at 110. An intent-column map may include each intent and the column in which that intent appears. The intent-column map may be used for identifying intents based on its column. The identification may be particularly useful after data manipulation is performed on the contents of a fully-populated token-intent map. Table 5 shows an exemplary intent-column map.

TABLE 5

| <intent, | column number> |
|---|---|
| <service intent - transaction, | 0> |
| <frequently asked question intent - overdraft protection, | 1> |
| <service intent - contact dispute, | 2> |
| <frequently asked question intent - debit card photo, | 3> |
| <service intent - transaction dispute, | 4> |

At step 112, the token-intent map may be populated with data. The data-populated token-intent map may be named a token-intent matrix. The token-intent matrix may include a score for each token as compared to each intent. The score may be based on a variety of criteria. In some embodiments, the score may be calculated based on equation C.

$$\text{Score for token } y \text{ compared to intent } x = \text{token } y \text{ word size} * \text{number of times token appears in training data for intent } x$$

Equation C

An exemplary token-intent matrix is shown in Table 6.

TABLE 6

| Token | SERVICE INTENT - TRANSACTION | FREQUENTLY ASKED QUESTION INTENT - OVERDRAFT PROTECTION | SERVICE INTENT - CONTACT DISPUTE | FREQUENTLY ASKED QUESTION - INTENT - DEBIT CARD PHOTO | SERVICE INTENT - TRANSACTION DISPUTE |
|---|---|---|---|---|---|
| help | 2 | 0 | 0 | 1 | 0 |
| with | 2 | 0 | 0 | 0 | 0 |
| transaction | 1 | 0 | 0 | 0 | 1 |
| a | 1 | 0 | 2 | 1 | 1 |
| merchant | 1 | 0 | 0 | 0 | 0 |
| charge | 1 | 0 | 0 | 0 | 0 |
| help with | 2 | 0 | 0 | 0 | 0 |
| with transaction | 2 | 0 | 0 | 0 | 0 |
| with a | 2 | 0 | 0 | 0 | 0 |
| a merchant | 2 | 0 | 0 | 0 | 0 |
| merchant charge | 2 | 0 | 0 | 0 | 0 |
| help with transaction | 2 | 0 | 0 | 0 | 0 |
| help with a | 3 | 0 | 0 | 0 | 0 |
| with a merchant | 3 | 0 | 0 | 0 | 0 |
| a merchant charge | 3 | 0 | 0 | 0 | 0 |
| overdraft | 0 | 1 | 0 | 0 | 0 |
| protection | 0 | 1 | 0 | 0 | 0 |
| what | 0 | 1 | 0 | 0 | 0 |
| is | 0 | 1 | 0 | 0 | 0 |
| tell | 0 | 1 | 0 | 0 | 0 |
| me | 0 | 1 | 0 | 1 | 0 |
| about | 0 | 1 | 0 | 0 | 0 |
| what is | 0 | 2 | 0 | 0 | 0 |
| is overdraft | 0 | 2 | 0 | 0 | 0 |
| overdraft protection | 0 | 2 | 0 | 0 | 0 |
| tell me | 0 | 2 | 0 | 0 | 0 |
| me about | 0 | 2 | 0 | 0 | 0 |
| about overdraft | 0 | 2 | 0 | 0 | 0 |
| what is overdraft | 0 | 3 | 0 | 0 | 0 |
| is overdraft protection | 0 | 3 | 0 | 0 | 0 |
| tell me about | 0 | 3 | 0 | 0 | 0 |
| me about overdraft | 0 | 3 | 0 | 0 | 0 |
| about overdraft protection | 0 | 3 | 0 | 0 | 0 |
| how | 0 | 0 | 1 | 0 | 0 |
| do | 0 | 0 | 1 | 0 | 0 |
| I | 0 | 0 | 2 | 1 | 0 |
| dispute | 0 | 0 | 1 | 0 | 1 |
| charge | 1 | 0 | 1 | 0 | 0 |
| want | 0 | 0 | 1 | 1 | 0 |
| to | 0 | 0 | 1 | 1 | 0 |
| contest | 0 | 0 | 1 | 0 | 0 |
| how do | 0 | 0 | 2 | 0 | 0 |
| do I | 0 | 0 | 2 | 0 | 0 |
| I dispute | 0 | 0 | 2 | 0 | 0 |
| dispute a | 0 | 0 | 2 | 0 | 2 |
| a charge | 0 | 0 | 2 | 0 | 0 |
| I want | 0 | 0 | 2 | 2 | 0 |
| want to | 0 | 0 | 2 | 2 | 0 |
| to contest | 0 | 0 | 2 | 0 | 0 |
| contest a | 0 | 0 | 2 | 0 | 0 |
| a charge | 0 | 0 | 2 | 0 | 0 |
| how do I | 0 | 0 | 3 | 0 | 0 |
| do I dispute | 0 | 0 | 3 | 0 | 0 |
| I dispute a | 0 | 0 | 3 | 0 | 0 |
| dispute a charge | 0 | 0 | 3 | 0 | 0 |
| I want to | 0 | 0 | 3 | 3 | 0 |
| want to contest | 0 | 0 | 3 | 0 | 0 |
| to contest a | 0 | 0 | 3 | 0 | 0 |
| contest a charge | 0 | 0 | 3 | 0 | 0 |
| want | 0 | 0 | 0 | 1 | 0 |
| to | 0 | 0 | 1 | 1 | 0 |
| change | 0 | 0 | 0 | 1 | 0 |
| my | 0 | 0 | 0 | 2 | 0 |
| card | 0 | 0 | 0 | 2 | 0 |
| photo | 0 | 0 | 0 | 2 | 0 |
| me | 0 | 1 | 0 | 1 | 0 |
| get | 0 | 0 | 0 | 1 | 0 |
| on | 0 | 0 | 0 | 1 | 0 |
| debit | 0 | 0 | 0 | 1 | 0 |
| I want | 0 | 0 | 2 | 2 | 0 |
| want to | 0 | 0 | 2 | 2 | 0 |
| to change | 0 | 0 | 0 | 2 | 0 |
| change my | 0 | 0 | 0 | 2 | 0 |
| my card | 0 | 0 | 0 | 2 | 0 |

TABLE 6-continued

| Token | SERVICE INTENT - TRANSACTION | FREQUENTLY ASKED QUESTION INTENT - OVERDRAFT PROTECTION | SERVICE INTENT - CONTACT DISPUTE | FREQUENTLY ASKED QUESTION - INTENT - DEBIT CARD PHOTO | SERVICE INTENT - TRANSACTION DISPUTE |
|---|---|---|---|---|---|
| card photo | 0 | 0 | 0 | 2 | 0 |
| Help me | 0 | 0 | 0 | 2 | 0 |
| me get | 0 | 0 | 0 | 2 | 0 |
| get a | 0 | 0 | 0 | 2 | 0 |
| a photo | 0 | 0 | 0 | 2 | 0 |
| photo on | 0 | 0 | 0 | 2 | 0 |
| on my | 0 | 0 | 0 | 2 | 0 |
| my debit | 0 | 0 | 0 | 2 | 0 |
| debit card | 0 | 0 | 0 | 2 | 0 |
| I want to | 0 | 0 | 3 | 3 | 0 |
| want to change | 0 | 0 | 0 | 3 | 0 |
| to change my | 0 | 0 | 0 | 3 | 0 |
| change my card | 0 | 0 | 0 | 3 | 0 |
| my card photo | 0 | 0 | 0 | 3 | 0 |
| Help me get | 0 | 0 | 0 | 3 | 0 |
| me get a | 0 | 0 | 0 | 3 | 0 |
| get a photo | 0 | 0 | 0 | 3 | 0 |
| a photo on | 0 | 0 | 0 | 3 | 0 |
| photo on my | 0 | 0 | 0 | 3 | 0 |
| on my debit | 0 | 0 | 0 | 3 | 0 |
| my debit card | 0 | 0 | 0 | 3 | 0 |
| dispute | 0 | 0 | 1 | 0 | 1 |
| deposit | 0 | 0 | 0 | 0 | 1 |
| dispute a | 0 | 0 | 0 | 0 | 2 |
| a transaction | 0 | 0 | 0 | 0 | 2 |
| a deposit | 0 | 0 | 0 | 0 | 2 |
| dispute a transaction | 0 | 0 | 0 | 0 | 3 |
| dispute a deposit | 0 | 0 | 0 | 0 | 3 |

The token-intent matrix may be translated into computer-readable form. In some embodiments, the computer-readable form of the token-intent matrix may include number sets. The number sets may correspond to the populated values included in the token-intent matrix. Each set may correspond to a row, which correspond to a token. At times, the row number and/or token may be included in a commented out portion adjacent each number set. An exemplary translated token-intent matrix may be shown in table 7.

TABLE 7

| | | | |
|---|---|---|---|
| {2, 0, 0, 1, 0} | // | 0 | help |
| {2, 0, 0, 0, 0} | // | 1 | with |
| {1, 0, 0, 0, 1} | // | 2 | transaction |
| {1, 0, 2, 1, 1} | // | 3 | a |
| {1, 0, 0, 0, 0} | // | 4 | merchant |
| {1, 0, 0, 0, 0} | // | 5 | charge |
| {2, 0, 0, 0, 0} | // | 6 | help with |
| {2, 0, 0, 0, 0} | // | 7 | with transaction |
| {2, 0, 0, 0, 0} | // | 8 | with a |
| {2, 0, 0, 0, 0} | // | 9 | a merchant |
| {2, 0, 0, 0, 0} | // | 10 | merchant charge |
| {2, 0, 0, 0, 0} | // | 11 | help with transaction |
| {3, 0, 0, 0, 0} | // | 12 | help with a |
| {3, 0, 0, 0, 0} | // | 13 | with a merchant |
| {3, 0, 0, 0, 0} | // | 14 | a merchant charge |
| {0, 1, 0, 0, 0} | // | 15 | overdraft |
| {0, 1, 0, 0, 0} | // | 16 | protection |
| {0, 1, 0, 0, 0} | // | 17 | what |
| {0, 1, 0, 0, 0} | // | 18 | is |
| {0, 1, 0, 0, 0} | // | 19 | tell |
| {0, 1, 0, 1, 0} | // | 20 | me |
| {0, 1, 0, 0, 0} | // | 21 | about |
| {0, 2, 0, 0, 0} | // | 22 | what is |
| {0, 2, 0, 0, 0} | // | 23 | is overdraft |
| {0, 2, 0, 0, 0} | // | 24 | overdraft protection |
| {0, 2, 0, 0, 0} | // | 25 | tell me |
| {0, 2, 0, 0, 0} | // | 26 | me about |
| {0, 2, 0, 0, 0} | // | 27 | about overdraft |
| {0, 3, 0, 0, 0} | // | 28 | what is overdraft |

TABLE 7-continued

| | | | |
|---|---|---|---|
| {0, 3, 0, 0, 0} | // | 29 | is overdraft protection |
| {0, 3, 0, 0, 0} | // | 30 | tell me about |
| {0, 3, 0, 0, 0} | // | 31 | me about overdraft |
| {0, 3, 0, 0, 0} | // | 32 | about overdraft protection |
| {0, 0, 1, 0, 0} | // | 33 | how |
| {0, 0, 1, 0, 0} | // | 34 | do |
| {0, 0, 2, 1, 0} | // | 35 | I |
| {0, 0, 1, 0, 1} | // | 36 | dispute |
| {1, 0, 1, 0, 0} | // | 37 | charge |
| {0, 0, 1, 1, 0} | // | 38 | want |
| {0, 0, 1, 1, 0} | // | 39 | to |
| {0, 0, 1, 0, 0} | // | 40 | contest |
| {0, 0, 2, 0, 0} | // | 41 | how do |
| {0, 0, 2, 0, 0} | // | 42 | do I |
| {0, 0, 2, 0, 0} | // | 43 | I dispute |
| {0, 0, 2, 0, 2} | // | 44 | dispute a |
| {0, 0, 2, 0, 0} | // | 45 | a charge |
| {0, 0, 2, 2, 0} | // | 46 | I want |
| {0, 0, 2, 2, 0} | // | 47 | want to |
| {0, 0, 2, 0, 0} | // | 48 | to contest |
| {0, 0, 2, 0, 0} | // | 49 | contest a |
| {0, 0, 2, 0, 0} | // | 50 | a charge |
| {0, 0, 3, 0, 0} | // | 51 | how do I |
| {0, 0, 3, 0, 0} | // | 52 | do I dispute |
| {0, 0, 3, 0, 0} | // | 53 | I dispute a |
| {0, 0, 3, 0, 0} | // | 54 | dispute a charge |
| {0, 0, 3, 3, 0} | // | 55 | I want to |
| {0, 0, 3, 0, 0} | // | 56 | want to contest |
| {0, 0, 3, 0, 0} | // | 57 | to contest a |
| {0, 0, 3, 0, 0} | // | 58 | contest a charge |
| {0, 0, 0, 1, 0} | // | 59 | want |
| {0, 0, 1, 1, 0} | // | 60 | to |
| {0, 0, 0, 1, 0} | // | 61 | change |
| {0, 0, 0, 2, 0} | // | 62 | my |
| {0, 0, 0, 2, 0} | // | 63 | card |
| {0, 0, 0, 2, 0} | // | 64 | photo |
| {0, 1, 0, 1, 0} | // | 65 | me |
| {0, 0, 0, 1, 0} | // | 66 | get |
| {0, 0, 0, 1, 0} | // | 67 | on |
| {0, 0, 0, 1, 0} | // | 68 | debit |
| {0, 0, 2, 2, 0} | // | 69 | I want |

TABLE 7-continued

| | | | |
|---|---|---|---|
| {0, 0, 2, 2, 0} | // | 70 | want to |
| {0, 0, 0, 2, 0} | // | 71 | to change |
| {0, 0, 0, 2, 0} | // | 72 | change my |
| {0, 0, 0, 2, 0} | // | 73 | my card |
| {0, 0, 0, 2, 0} | // | 74 | card photo |
| {0, 0, 0, 2, 0} | // | 75 | Help me |
| {0, 0, 0, 2, 0} | // | 76 | me get |
| {0, 0, 0, 2, 0} | // | 77 | get a |
| {0, 0, 0, 2, 0} | // | 78 | a photo |
| {0, 0, 0, 2, 0} | // | 79 | photo on |
| {0, 0, 0, 2, 0} | // | 80 | on my |
| {0, 0, 0, 2, 0} | // | 81 | my debit |
| {0, 0, 0, 2, 0} | // | 82 | debit card |
| {0, 0, 3, 3, 0} | // | 83 | I want to |
| {0, 0, 0, 3, 0} | // | 84 | want to change |
| {0, 0, 0, 3, 0} | // | 85 | to change my |
| {0, 0, 0, 3, 0} | // | 86 | change my card |
| {0, 0, 0, 3, 0} | // | 87 | my card photo |
| {0, 0, 0, 3, 0} | // | 88 | Help me get |
| {0, 0, 0, 3, 0} | // | 89 | me get a |
| {0, 0, 0, 3, 0} | // | 90 | get a photo |
| {0, 0, 0, 3, 0} | // | 91 | a photo on |
| {0, 0, 0, 3, 0} | // | 92 | photo on my |
| {0, 0, 0, 3, 0} | // | 93 | on my debit |

TABLE 7-continued

| | | | |
|---|---|---|---|
| {0, 0, 0, 3, 0} | // | 94 | my debit card |
| {0, 0, 1, 0, 1} | // | 95 | dispute |
| {0, 0, 0, 0, 1} | // | 96 | deposit |
| {0, 0, 0, 0, 2} | // | 97 | dispute a |
| {0, 0, 0, 0, 2} | // | 98 | a transaction |
| {0, 0, 0, 0, 2} | // | 99 | a deposit |
| {0, 0, 0, 0, 3} | // | 100 | dispute a transaction |
| {0, 0, 0, 0, 3} | // | 101 | dispute a deposit |

A system, computer and/or processor may execute functions on the token-intent matrix. Such functions may include decomposition functions, such as singular value decomposition ("SVD"), as shown at 114. The token-intent matrix may be decomposed into a token-cognitive matrix, shown at 116, which may be a U-matrix, shown at table 8 below, cognitive-comprehension matrix, shown at 118, which may be an S-matrix, shown at table 9 below, and intent cognitive matrix, shown at 120, which may be a V-matrix, shown at table 10 below. The rank, which may be defined as the number of non-zero entries in the major diagonal, of the cognitive-comprehension matrix may be reduced in order to minimize the amount of calculations required.

TABLE 8

(U-Matrix)

| | | | | |
|---|---|---|---|---|
| 13.990118352358282 | 0.0 | 0.0 | 0.0 | 0.0 |
| 0.0 | 10.955540321803017 | 0.0 | 0.0 | 0.0 |
| 0.0 | 0.0 | 8.71722632834785 | 0.0 | 0.0 |
| 0.0 | 0.0 | 0.0 | 8.240892740287421 | 0.0 |
| 0.0 | 0.0 | 0.0 | 0.0 | 6.111495457561394 |

TABLE 9

(S-Matrix)

| | | | | |
|---|---|---|---|---|
| 0.07158290616246268 | 0.024056795854892565 | −0.0015734078026510387 | 0.2401142998126629 | 0.01789870716345458 |
| 0.004337997037419826 | −0.0068399148921805784 | −4.3032407077997205E−4 | 0.24199896354412462 | 0.019015063057184457 |
| 0.0036917287819764 | −0.010426091144847107 | −1.5850450711377996E−4 | 0.12760899236011222 | −0.15335488818435292 |
| 0.11910443955673813 | −0.1505942237476286 | −2.370655884339272E−4 | 0.11360760026038616 | −0.1293568124066746 |
| 0.002168998518709816 | −0.0034199574460904093 | −2.1516203539000028E−4 | 0.12099948177206232 | 0.009507531528591852 |
| 0.0262528993435691 | −0.0889523791210179 | 3.170992898855409E−4 | 0.11494111758793023 | 0.02206474736429569 |
| 0.004337997037419632 | −0.006839914892180819 | −4.3032407077990044E−4 | 0.24199896354412465 | 0.019015063057183704 |
| 0.004337997037419632 | −0.006839914892180819 | −4.3032407077990044E−4 | 0.24199896354412465 | 0.019015063057183704 |
| 0.004337997037419632 | −0.006839914892180819 | −4.3032407077990044E−4 | 0.24199896354412465 | 0.019015063057183704 |
| 0.004337997037419632 | −0.006839914892180819 | −4.3032407077990044E−4 | 0.24199896354412465 | 0.019015063057183704 |
| 0.004337997037419632 | −0.006839914892180819 | −4.3032407077990044E−4 | 0.24199896354412465 | 0.019015063057183704 |
| 0.006506995556129414 | −0.010259872338271222 | −6.454861061698582E−4 | 0.36299844531618697 | 0.028522594585775485 |
| 0.006506995556129414 | −0.010259872338271222 | −6.454861061698582E−4 | 0.36299844531618697 | 0.028522594585775485 |
| 0.006506995556129414 | −0.010259872338271222 | −6.454861061698582E−4 | 0.36299844531618697 | 0.028522594585775485 |
| 0.006506995556129414 | −0.010259872338271222 | −6.454861061698582E−4 | 0.36299844531618697 | 0.028522594585775485 |
| 5.61668835487065E−4 | 7.018173354269856E−4 | 0.11470824199881384 | 2.330287717652465E−4 | 2.8884004531273177E−5 |
| 5.61668835487065E−4 | 7.018173354269856E−4 | 0.11470824199881384 | 2.330287717652465E−4 | 2.8884004531273177E−5 |
| 5.61668835487065E−4 | 7.018173354269856E−4 | 0.11470824199881384 | 2.330287717652465E−4 | 2.8884004531273177E−5 |
| 5.61668835487065E−4 | 7.018173354269856E−4 | 0.11470824199881384 | 2.330287717652465E−4 | 2.8884004531273177E−5 |
| 0.0678065779605302 | 0.03159528808250039 | 0.11356515826694268 | −0.0016516349596965665 | −0.0010874718 891976697 |
| 5.61668835487065E−4 | 7.018173354269856E−4 | 0.11470824199881384 | 2.330287717652465E−4 | 2.8884004531273177E−5 |
| 0.00112333767097413 | 0.0014036346708539713 | 0.22941648399762768 | 4.66057543530493E−4 | 5.7768009062546354E−5 |
| 0.00112333767097413 | 0.0014036346708539713 | 0.22941648399762768 | 4.66057543530493E−4 | 5.7768009062546354E−5 |
| 0.00112333767097413 | 0.0014036346708539713 | 0.22941648399762768 | 4.66057543530493E−4 | 5.7768009062546354E−5 |
| 0.00112333767097413 | 0.0014036346708539713 | 0.22941648399762768 | 4.66057543530493E−4 | 5.7768009062546354E−5 |
| 0.00112333767097413 | 0.0014036346708539713 | 0.22941648399762768 | 4.66057543530493E−4 | 5.7768009062546354E−5 |
| 0.0016850065064611894 | 0.002105452006280929 | 0.34412472599644145 | 6.99086315295737E−4 | 8.665201359384393E−5 |
| 0.0016850065064611894 | 0.002105452006280929 | 0.34412472599644145 | 6.99086315295737E−4 | 8.665201359384393E−5 |
| 0.0016850065064611894 | 0.002105452006280929 | 0.34412472599644145 | 6.99086315295737E−4 | 8.665201359384393E−5 |
| 0.0016850065064611894 | 0.002105452006280929 | 0.34412472599644145 | 6.99086315295737E−4 | 8.665201359384393E−5 |
| 0.0016850065064611894 | 0.002105452006280929 | 0.34412472599644145 | 6.99086315295737E−4 | 8.665201359384393E−5 |
| 0.024083900824859283 | −0.08553242167492754 | 5.322613252755057E−4 | −0.006058364184132117 | 0.012557215835703836 |
| 0.024083900824859283 | −0.08553242167492754 | 5.322613252755057E−4 | −0.006058364184132117 | 0.012557215835703836 |
| 0.11541271077476173 | −0.14016813260278158 | −7.856108132015297E−5 | −0.014001392099726031 | 0.023998075777678665 |
| 0.025606631088125893 | −0.09253855537368406 | 5.889188535516991E−4 | 5.511464039177639E−4 | −0.15030520387724128 |

TABLE 9-continued (S-Matrix)

| | | | | |
|---|---|---|---|---|
| 0.09132880994990242 | −0.05463571092785408 | −6.108224065956649E−4 | −0.007943027915593927 | 0.011440859941974848 |
| 0.09132880994990242 | −0.05463571092785408 | −6.108224065956649E−4 | −0.007943027915593927 | 0.011440859941974848 |
| 0.024083900824859283 | −0.08553242167492754 | 5.322613252755057E−4 | −0.006058364184132117 | 0.012557215835703836 |
| 0.04816780164971857 | −0.17106484334985508 | 0.0010645226505510113 | −0.012116728368264234 | 0.025114431671407672 |
| 0.04816780164971857 | −0.17106484334985508 | 0.0010645226505510113 | −0.012116728368264234 | 0.025114431671407672 |
| 0.04816780164971857 | −0.17106484334985508 | 0.0010645226505510113 | −0.012116728368264234 | 0.025114431671407672 |
| 0.051213262176251786 | −0.18507711074736813 | 0.0011778377071033981 | 0.0011022928078355278 | −0.30061040775448256 |
| 0.04816780164971857 | −0.17106484334985508 | 0.0010645226505510113 | −0.012116728368264234 | 0.025114431671407672 |
| 0.18265761989980484 | −0.10927142185570816 | −0.0012216448131913298 | −0.015886055831187854 | 0.022881719883949696 |
| 0.18265761989980484 | −0.10927142185570816 | −0.0012216448131913298 | −0.015886055831187854 | 0.022881719883949696 |
| 0.04816780164971857 | −0.17106484334985508 | 0.0010645226505510113 | −0.012116728368264234 | 0.025114431671407672 |
| 0.04816780164971857 | −0.17106484334985508 | 0.0010645226505510113 | −0.012116728368264234 | 0.025114431671407672 |
| 0.04816780164971857 | −0.17106484334985508 | 0.0010645226505510113 | −0.012116728368264234 | 0.025114431671407672 |
| 0.07225170247457786 | −0.2565972650247825 | 0.0015967839758265427 | −0.018175092552396317 | 0.037671647507111376 |
| 0.07225170247457786 | −0.2565972650247825 | 0.0015967839758265427 | −0.018175092552396317 | 0.037671647507111376 |
| 0.07225170247457786 | −0.2565972650247825 | 0.0015967839758265427 | −0.018175092552396317 | 0.037671647507111376 |
| 0.07225170247457786 | −0.2565972650247825 | 0.0015967839758265427 | −0.018175092552396317 | 0.037671647507111376 |
| 0.2739864298497073 | −0.16390713278356225 | −0.0018324672197869373 | −0.023829083746781794 | 0.03432257982592463 |
| 0.07225170247457786 | −0.2565972650247825 | 0.0015967839758265427 | −0.018175092552396317 | 0.037671647507111376 |
| 0.07225170247457786 | −0.2565972650247825 | 0.0015967839758265427 | −0.018175092552396317 | 0.037671647507111376 |
| 0.09132880994990242 | −0.05463571092785408 | −6.108224065956649E−4 | −0.007943027915593927 | 0.011440859941974848 |
| 0.06724490912504309 | 0.030896710747073418 | −0.0011430837318711642 | −0.0018846637331461813 | −0.0011163558937289614 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.06724490912504309 | 0.030896710747073418 | −0.0011430837318711642 | −0.0018846637331461813 | −0.0011163558937289614 |
| 0.06724490912504309 | 0.030896710747073418 | −0.0011430837318711642 | −0.0018846637331461813 | −0.0011163558937289614 |
| 0.06724490912504309 | 0.030896710747073418 | −0.0011430837318711642 | −0.0018846637331461813 | −0.0011163558937289614 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.13448981825008618 | 0.061793421494146836 | −0.0022861674637423284 | −0.003769327462923626 | −0.0022327117874579227 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.20173472737512937 | 0.09269013224122025 | −0.0034292511956134928 | −0.005653991194385459 | −0.003349067681186869 |
| 0.0015227302632665888 | −0.007006133698756577 | 5.665752827621592E−5 | 0.006609510588049865 | −0.1628624197129451 |
| 0.0030454605265331776 | −0.014012267397513154 | 1.1331505655243184E−4 | 0.01321902117609973 | −0.3257248394258902 |
| 0.0030454605265331776 | −0.014012267397513154 | 1.1331505655243184E−4 | 0.01321902117609973 | −0.3257248394258902 |
| 0.0030454605265331776 | −0.014012267397513154 | 1.1331505655243184E−4 | 0.01321902117609973 | −0.3257248394258902 |
| 0.004568190789799779 | −0.02101840109626966 | 1.6997258482862162E−4 | 0.0198285317641496 | −0.4885872591388353 |
| 0.004568190789799779 | −0.02101840109626966 | 1.6997258482862162E−4 | 0.0198285317641496 | −0.4885872591388353 |

TABLE 10

(V-Matrix)

| | | | | |
|---|---|---|---|---|
| 0.030344545982839862 | −0.03746748169949368 | −0.0018756161597619468 | 0.9971437509139276 | 0.05810523574961103 |
| 0.007857813483295222 | 0.007688881116810499 | 0.9999377072305563 | 0.0019203651135183042 | 1.7652446248910038E−4 |
| 0.3369366229262409 | −0.9370538944811254 | 0.004639842438252611 | −0.04992632942303175 | 0.0767433675395225 |
| 0.9407642372529308 | 0.3384901604006474 | −0.009964519602973511 | −0.015531311662486794 | −0.006822603973546015 |
| 0.02130317660181752 | −0.07675598023666995 | 4.93896497188793E−4 | 0.054468267821912976 | −0.9953329382831204 |

Singular value decomposition, also referred to herein as SVD, may be a factorization of a real or complex matrix. SVD may be the generalization of the eigendecomposition of a positive semidefinite normal matrix to any m*n matrix using an extension of the polar decomposition. An example of a semidefinite normal matrix is a symmetric matrix with positive eigenvalues.

The decomposition functions may enable retrieval of information. This information may only become available after one or more functions are executed on the token-intent matrix. Such information may include relationship information between tokens and intents. Such information may also include a hypothetical space of entanglement that connects tokens, and the utterances from which they were retrieved, to intents.

Pre-computed token vectors may be identified from a computation that multiplies the rank-reduced token cognitive matrix and the cognitive-comprehension matrix. Pre-computed intent-cognitive matrix may be computed from a computation that multiplies the cognitive-comprehension matrix and the intent-cognitive matrix.

At runtime, the system may receive an utterance, shown at 126. The utterance may be canonicalized, as shown at 128. A distance computation may be performed, as shown at 130 and 131. The distance computation may include comparing each of the utterance tokens retrieved from the canonicalized utterance to the plurality of token vectors. The distance computation may include calculating a centroid token vector from the retrieved token vectors. The distance computation may include computing the distance between the centroid token vectors and each of the plurality of intent-cognitive vectors. The distance computation may include generating a scalar value from each distance computation between the centroid vector and the plurality of intent-cognitive vectors.

The system may retrieve a predetermined number of intents that rank highest. The system may order the retrieved intents, as shown at 132. Table 11 shows ordering of intents for two distinct utterances.

TABLE 11

Query 1 - how do I change a photo on my card
QUANTUM PREDICTED INTENT ORDERING:

| | |
|---|---|
| FREQUENTLY ASKED QUESTION INTENT - DEBIT CARD PHOTO | 0.8426352042771837 <<<<< Top predicted intent |
| SERVICE INTENT - CONTACT DISPUTE | 0.6448734309535712 |
| SERVICE INTENT - TRANSACTION DISPUTE | 0.15802105163898786 |
| SERVICE INTENT - TRANSACTION | 0.13930228955169183 |
| FREQUENTLY ASKED QUESTION INTENT - OVERDRAFT PROTECTION | 0.003981799716555818 |

Query 2 - what should I do to dispute a transaction
QUANTUM PREDICTED INTENT ORDERING:

| | |
|---|---|
| SERVICE INTENT - TRANSACTION DISPUTE | 0.7536213120878849 <<<<< Top predicted intent |
| SERVICE INTENT - CONTACT DISPUTE | 0.668401949232465 |
| FREQUENTLY ASKED QUESTION INTENT - DEBIT CARD PHOTO | 0.31280333173656955 |
| SERVICE INTENT - TRANSACTION | 0.20409395740602165 |
| FREQUENTLY ASKED QUESTION INTENT - OVERDRAFT PROTECTION | 0.08994043970346943 |

Thus, methods and apparatus for quantum technology for use with extracting intents from linguistics have been provided. Persons skilled in the art will appreciate that the present invention can be practiced by other than the described embodiments, which are presented for purposes of illustration rather than of limitation, and that the present invention is limited only by the claims that follow.

What is claimed is:

1. A three-stage method for mapping a user utterance onto a plurality of intents, the method comprising:
   at a first stage, said first stage comprising training a system to determine an intent based on an utterance:
      receiving intent training data at an intent training database, the intent training data comprising a plurality of training utterances and a plurality of intents;
      canonicalizing the plurality of training utterances into a plurality of tokens, said tokens comprising a plurality of unigrams, bigrams and trigrams;
      forming a token-intent map, said token-intent map comprising a plurality of intents as column identifiers and a plurality of tokens as row identifiers;
      generating a token-row map based on the token-intent map, said token-row map comprising each token and the row in which the token appears in the intent training database;
      generating an intent-column map based on the token-intent map, said intent-column map comprising each intent and the column in which the intent appears;
      mapping, using the token-row map and the intent-column map, the plurality of tokens on a token-intent matrix, said token-intent matrix comprising each token, each intent and a score for each token relative to each intent, said score being based on the data included in the intent training database;
      executing a decomposition on the token-intent matrix;
      generating, from the decomposition, a token-cognitive matrix (U-matrix), a cognitive-comprehension matrix (S-matrix) and an intent-cognitive matrix (V-matrix), said cognitive-comprehension matrix being the space of entanglement between the token-cognitive matrix and the intent-cognitive matrix;
      reducing the rank of the token-cognitive matrix;
      computing a plurality of token vectors from a multiplication of the token-cognitive matrix and the cognitive-comprehension matrix;
      computing a plurality of intent-cognitive vectors from a multiplication of the cognitive-comprehension matrix and the intent-cognitive matrix;
   at a second stage, said second stage comprising determining the intent of an utterance at runtime:
      receiving an utterance from a user;
      canonicalizing the utterance into a plurality of utterance tokens;
      comparing each of the utterance tokens to the plurality of token vectors;
      retrieving the token vectors that match the plurality of utterance tokens;
      calculating a centroid token vector from the retrieved token vectors;
      executing a distance computation between the centroid token vector and each of the plurality of intent-cognitive vectors;
      generating a scalar value from each distance computation between the centroid token vector and the plurality of intent-cognitive vectors;
      ordering a plurality of intent-cognitive vectors based on each intent-cognitive vector's associated scalar value; and
      presenting a predetermined number of intent-cognitive vectors with the highest scalar values to an ensemble processor;

at a third stage, said third stage comprising processing by the ensemble processor:
- arranging, by the ensemble processor, a plurality of intents associated with the intent-cognitive vectors;
- presenting the plurality of intents to the user;
- retrieving one or more answers associated with the plurality of intents; and
- displaying the one or more answers to the user.

2. The method of claim 1, wherein the decomposition is singular value decomposition.

3. The method of claim 1, wherein the score is the word size of the token multiplied by the amount of times the token appears in the training data for the identified intent.

4. The method of claim 1, wherein the distance computation is a cosine distance computation.

5. The method of claim 1, wherein the distance computation is the dot product of the matrix representing each intent, and the vector that represents the centroid of the tokens in the given utterance, divided by the Euclidean distance which is computed as the square root of the sum of the squares of the difference between corresponding vector sums of the squares of the difference between corresponding vector dimensions of the utterance and each intent.

6. A three-stage method for mapping a user utterance onto a plurality of intents, the method comprising:
- at a first stage, said first stage comprising training a system to determine an intent based on an utterance:
  - receiving intent training data at an intent training database, the intent training data comprising a plurality of training utterances and a plurality of intents, together with a relationship between each intent, included in the plurality of intents, and the plurality of training utterances;
  - canonicalizing the plurality of training utterances into a plurality of tokens, said tokens comprising a plurality of unigrams, bigrams and trigrams;
  - forming a token-intent map, said token-intent map comprising a plurality of intents as column identifiers and a plurality of tokens as row identifiers;
  - generating a token-row map based on the token-intent map, said token-row map comprising each token and ordinal value of the row in which the token appears in the intent training database;
  - generating an intent-column map based on the token-intent map, said intent-column map comprising each intent and the column in which the intent appears;
  - mapping, using the token-row map and the intent-column map, the plurality of tokens on a token-intent matrix, said token-intent matrix comprising each token, each intent and a score for each token relative to each intent, said score being based on the data included in the intent training database;
  - executing a decomposition on the token-intent matrix;
  - generating, from the decomposition, a token-cognitive matrix, a cognitive-comprehension matrix and an intent-cognitive matrix, said cognitive-comprehension matrix being the space of entanglement between the token-cognitive matrix and the intent-cognitive matrix;
  - reducing the rank of the cognitive-comprehension matrix;
  - computing a plurality of token vectors from a computation of the token-cognitive matrix and the cognitive-comprehension matrix; and
  - computing a plurality of intent-cognitive vectors from a computation of the cognitive-comprehension matrix and the intent-cognitive matrix;
- at a second stage, said second stage comprising determining the intent of an utterance at runtime:
  - receiving an utterance from a user;
  - canonicalizing the utterance into a plurality of utterance tokens;
  - comparing each of the utterance tokens to the plurality of token vectors;
  - retrieving the token vectors that match the plurality of utterance tokens;
  - calculating a centroid token vector from the retrieved token vectors;
  - executing a distance computation between the centroid token vector and each of the plurality of intent-cognitive vectors;
  - generating a scalar value from each distance computation between the centroid token vector and the plurality of intent-cognitive vectors;
  - ordering a plurality of intent-cognitive vectors based on each intent-cognitive vector's associated scalar value; and
  - presenting a predetermined number of intent-cognitive vectors with the highest scalar values to an ensemble processor;
- at a third stage, said third stage comprising processing by the ensemble processor:
  - arranging, by the ensemble processor, a plurality of intents associated with the intent-cognitive vectors;
  - presenting the plurality of intents to the user;
  - retrieving one or more answers associated with the plurality of intents; and
  - displaying the one or more answers to the user.

7. The method of claim 6, wherein the decomposition is singular value decomposition.

8. The method of claim 6, wherein the score is the word size of the token multiplied by the amount of times the token appears in the training data for the identified intent.

9. The method of claim 6, wherein the distance computation is a cosine distance computation.

10. A three-staged apparatus for mapping a user utterance onto a plurality of intents, the apparatus comprising:
- a first stage comprising:
  - an intent training database comprising intent training data, said intent training data comprising a plurality of training utterances and intents;
  - a processor configured to:
    - canonicalize the plurality of training utterances into a plurality of tokens, the tokens comprising a plurality of unigrams, bigrams and trigrams;
    - generate a token-intent map, said token-intent map comprising a plurality of intents as column identifiers and a plurality of tokens as row identifiers;
    - generate a token-row map based on the token-intent map, said token-row map comprising each token and the row in which the token appears in the intent training database;
    - generate an intent-column map based on the token-intent map, said intent-column map comprising each intent and the column in which the intent appears;
    - map, using the token-row map and the intent-column map, the plurality of tokens on a token-intent matrix, said token-intent matrix comprising each token, each intent and a score for each token relative to each intent, said score being based on the data included in the intent training database;

execute a decomposition on the token-intent matrix;
generate, from the decomposition, a token-cognitive matrix (U-matrix), a cognitive-comprehension matrix (S-matrix) and an intent-cognitive matrix (V-matrix), said cognitive-comprehension matrix being the space of entanglement between the token-cognitive matrix and the intent-cognitive matrix;
reduce the rank of the token-cognitive matrix;
compute a plurality of token vectors from a multiplication of the token-cognitive matrix and the cognitive-comprehension matrix;
compute a plurality of intent-cognitive vectors from a multiplication of the cognitive-comprehension matrix and the intent-cognitive matrix;
a second stage comprising:
  a second processor operable to:
    receive an utterance from a user;
    canonicalize the utterance into a plurality of utterance tokens;
    compare each of the utterance tokens to the plurality of token vectors;
    retrieve the token vectors that match the plurality of utterance tokens;
    calculate a centroid token vector from the retrieved token vectors;
    execute a distance computation between the centroid token vector and each of the plurality of intent-cognitive vectors;
    generate a scalar value from each distance computation between the centroid token vector and the plurality of intent-cognitive vectors;
    order a plurality of intent-cognitive vectors based on each intent-cognitive vector's associated scalar value; and
    present a predetermined number of intent-cognitive vectors with the highest scalar values to an ensemble processor;
a third stage comprising:
  the ensemble processor, said ensemble processor operable to:
    arrange a plurality of intents associated with the intent-cognitive vectors;
    present the plurality of intents to the user;
    retrieve one or more answers associated with the plurality of intents; and
    display the one or more answers to the user.

11. The apparatus of claim 10, wherein the decomposition is singular value decomposition.

12. The apparatus of claim 10, wherein the score is the word size of the token multiplied by the amount of times the token appears in the training data for the identified intent.

13. The apparatus of claim 10, wherein the distance computation is a cosine distance computation.

* * * * *